United States Patent [19]

Hartman et al.

[11] 4,144,205

[45] Mar. 13, 1979

[54] BARK EXTENDED PHENOLIC RESIN ADHESIVE COMPOSITION AND PROCESS FOR PREPARING SAME

[75] Inventors: Seymour Hartman, Mahopac, N.Y.; Mulayim Ozkan, Waterbury, Conn.

[73] Assignee: Champion International Corporation, Stamford, Conn.

[21] Appl. No.: 769,917

[22] Filed: Feb. 18, 1977

[51] Int. Cl.$^2$ ........................ C08L 61/14; C08L 89/00
[52] U.S. Cl. .................................... 260/7; 260/17.2; 428/529
[58] Field of Search ................................ 260/17.2, 7

[56] References Cited

U.S. PATENT DOCUMENTS

| | | | |
|---|---|---|---|
| 2,574,784 | 11/1951 | Heritage | 260/17.2 |
| 3,213,045 | 10/1965 | Klein et al. | 260/17.2 |
| 3,518,210 | 6/1970 | Edelstein | 260/17.2 |

*Primary Examiner*—Howard E. Schain
*Attorney, Agent, or Firm*—Evelyn M. Sommer

[57] ABSTRACT

A new and improved, high quality, bark-extended phenolic resin adhesive composition for bonding wood plies, particularly southern mill wood such as the southern pine, comprising the reaction product of finely ground wood bark particles treated with a caustic solution and a low molecular weight, aqueous alkaline phenol-aldehyde resin. The resin has a low degree of polymerization and is soluble in all proportions in ethanol. The resulting adhesive has a proportion by weight of total resin solids in the range of approximately 25.1% to 20.9% and a proportion of total solids in a range of approximately 40% to 40.85% based upon the total weight of the adhesive composition. The adhesive has a viscosity in a range of approximately 9,000 centipoise to 10,600 centipoise. An adhesive of this type particularly suitable for bonding western wood species such as the Douglas fir comprises the reaction product of finely ground wood bark particles treated with a caustic solution, a low molecular weight aqueous alkaline phenol-aldehyde resin having a low degree of polymerization, which resin is soluble in all proportions in ethanol, and various fillers such as wheat flour, Norprofil (Norprofil is a trade name for powdered or ground corn and rice husks or corn cobs), etc. The proportion of total resin solids is in the range of approximately 24.6% to 21.9%, and the proportion of total solids is in the range of approximately 40.28% and 38.6%. The viscosity of the resulting adhesive is in the range of approximately 2,100 centipoise to 1,975 centipoise. The processes for preparing the subject adhesives include preparing a premix comprising bark, a caustic solution, and water, then adding and mixing the remaining components under varying time conditions. There is no requirement for the external addition of heat.

3 Claims, 2 Drawing Figures

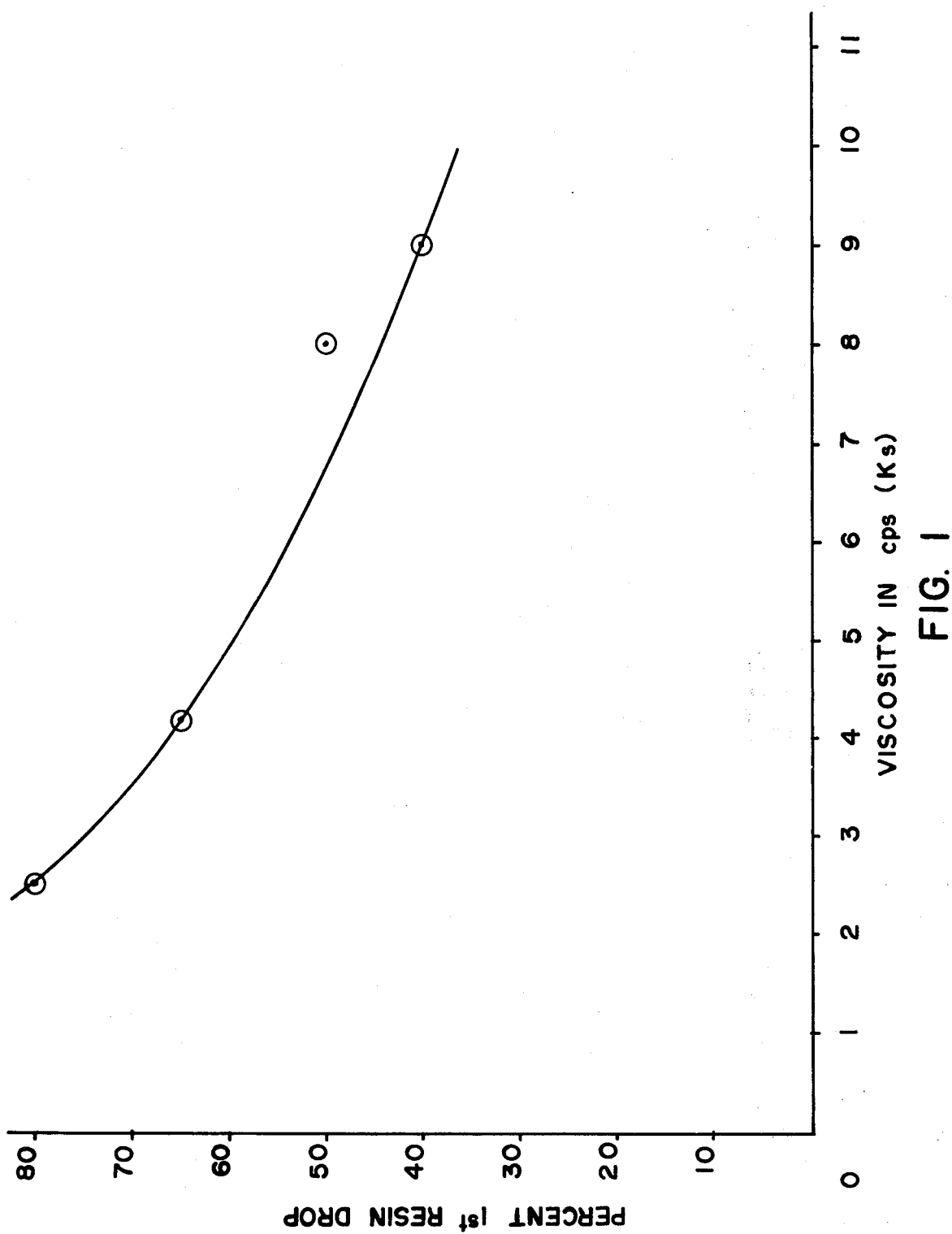

REDUCTION OF PERCENT PHENOL-ALDEHYDE RESIN SOLIDS WITH ALKALI TREATED BARK REPLACING ALL CORN-COB

| | STANDARD FORMULA WITH 28.5% TOTAL RESIN SOLIDS | FORMULA WITH 25.1% TRS- ALKALI BARK FOR CORN-COB | FORMULA WITH 23.8% TRS- REPLACING ALL CORN-COB WITH ALKALI BARK | FORMULA WITH 22.4% TRS- REPLACING ALL CORN-COB WITH ALKALI BARK | FORMULA WITH 20.9% TRS- REPLACING ALL CORN-COB WITH ALKALI BARK | FORMULA WITH 18.8% TRS- REPLACING ALL CORN-COB WITH ALKALI BARK |
|---|---|---|---|---|---|---|
| BARK | | 146.5 pbw* | 156.5 pbw | 168.2 pbw | 162.1 pbw | 164 pbw |
| NaOH (50%) | | 117.1 | 125.2 | 134.6 | 129.7 | 131 |
| WATER | | 486.7 | 520 | 559.3 | 539 | 547.8 |
| | MIX — 15 MIN. — UNTIL EXOTHERM SUBSIDES | | | | | |
| WATER | 495.6 pbw | 219.6 | 234.8 | 252.3 | 243.2 | 247.1 |
| BARK | — | 109.8 | 117.4 | 126.2 | 121.6 | 123.6 |
| GLUE-X | 149.1 | 146.4 | 156.5 | 168.2 | 162.1 | 164.7 |
| CORN-COB | 260.8 | — | — | — | — | — |
| RESIN | 223.6 | 525.6 | 183.1 | 156.4 | 142.7 | 1095.6 |
| | MIX 5 MIN. | | | | | |
| NaOH (50%) | 111.8 | 21.9 | 23.5 | 25.2 | 24.3 | 24.7 |
| | MIX 20 MIN. | | | | | |
| RESIN | 1759 | 1226.5 | 1482.4 | 1409.6 | 1151 | — |
| WATER | — | — | — | — | 162.1 | — |
| RESIN | — | — | — | — | 162.1 | — |
| | MIX 3-5 MIN. | | | | | |
| VISCOSITY (cps) | 11,400 cps | 9,600 | 9,200 | 10,600 | 9,000 | 14,000 |
| % TRS | 28.5 | 25.1 | 23.87 | 22.4 | 20.9 | 18.8 |
| % TOTAL SOLIDS | 43.92 | 40.85 | 40.3 | 40.5 | 40 | 38.3 |
| AVERAGE SHEAR: | | | | | | |
| V/P**_psi | 189.8 | 168.8 | 181.2 | 200.7 | 175.3 | 148.8 |
| /% WF*** | 90.2 | 87.1 | 87.8 | 88 | 88.3 | 80.2 |
| BOIL—psi | 160.8 | 139.6 | 150 | 166.6 | 146.5 | 122.5 |
| /% WF | 94 | 90.1 | 91.3 | 88.4 | 89.8 | 85.3 |

FIG.2

\* PARTS BY WEIGHT
\*\* VACUUM PRESSURE
\*\*\* WOOD FAILURE

BARK EXTENDED PHENOLIC RESIN ADHESIVE COMPOSITION AND PROCESS FOR PREPARING SAME

The subject invention relates to new and improved adhesives used in connection with wood and allied products, such as laminates, lumber, plywood, particleboard, etc., and with processes for preparing the same. More particularly, the subject invention relates to new and improved high quality phenolic resin adhesives in which tree bark is used as an extender.

It is well known in the art to prepare plywood boards, wood particle boards, hardwood boards, and the like by various processes using many types of adhesives and glue resin mixes. For example, typical particle board processes are described in U.S. Pat. No. 2,686,143, issued Aug. 10, 1954, inventor Fahrni, (Canada Pat. No. 536,289 issued Jan. 29, 1957), entitled "PROCESS FOR MANUFACTURING WOODEN BOARD", and in U.S. Pat. No. 2,642,371, issued June 16, 1953 (Canada Pat. No. 521,195 issued Feb. 14, 1956), inventor Fahrni, entitled "COMPOSITE WOODEN BOARD". Both of these patents are exclusively licensed to the assignee hereof, and are incorporated herein by reference.

It is also known in the art to add many types of so-called "extenders", such as bark dust, corn cobs and similar powdery waste materials, to the adhesive mix to improve its quality characteristics, and also to reduce its costs in order to more economically produce the plywood and particle board products. For example, in a patent to Heritage, U.S. Pat. No. 2,574,784, issued Nov. 13, 1951 and entitled "PHENOLIC ADHESIVE AND METHOD OF BONDING WOOD PLIES" it is taught that bark powder from such trees as the Douglas fir, ponderosa pine and western hemlock, is treated with water and alkali at an elevated temperature and the resulting mass reacted with a phenolic resin to form the adhesive. In the aforesaid process, it is essential that the water and alkali be heated to a temperature in excess of about 180° F.

Another procedure known to the art is described in the patent to Klein, U.S. Pat. No. 3,213,045, issued Oct. 19, 1965 and entitled "PHENOLIC ADHESIVES AND METHOD". This patent teaches the preparation of adhesive compositions for use in the manufacture of plywood in which redwood bark dust is reacted with an alkali metal hydroxide. To the product of this reaction there is added a predominately high molecular weight, aqueous alkaline, phenol-aldehyde resin characterized by a demonstrably high degree of advancement of polymerization (as evidenced by the formation of a precipitate on addition of ethanol to aqueous alkaline solutions of the resin). Several shortcomings, however, exist in the process described in this patent. First, the patent teaches that the use of phenol-aldehyde resins having a high molecular weight and an advance degree of polymerization is essential in order to insure stability and a press time on the order of 6½ to 7 minutes. However, the use of such resins reduces the number of reactive sites on the growing polymer resin chain and limits the extent of the reaction of the bark with the resin. Second, only the bark from redwood trees is deemed effective as an "extender". This eliminates the virtually inexhaustible supply of material that is available from coniferous trees such as the firs, the pines, the cedars, and the hemlocks, the bark of such trees being readily obtainable as a by-product from industry utilizing the woody portion of the tree. Although Klein indicates that the use of the bark of said trees is not desirable, it will be shown hereinafter that in accordance with the subject invention, any type of bark may be used to produce a high quality adhesive for the production of plywood characterized by its capacity to resist almost unlimited exposure to moisture, heat and weather. Third, there is no apparent reduction in the percent of resin solids used in the formulation of the adhesive as compared to typical adhesives which do not use bark as an extender. Thus, no real or significant economy is realized in the use of the known extended adhesive.

Another process in the prior art is described in the patent to Herrick, U.S. Pat. No. 3,025,250, issued Mar. 13, 1962, and entitled "RESIN COMPOSITION CONTAINING ALKALI-BARK PRODUCT AND PHENOL-FORMALDEHYDE RESIN, AND METHOD OF PREPARATION." However, in Herrick, only bark having an initial formaldehyde reactivity of 5% or higher may be used as the reactive phenolformaldehyde resin adhesive extender. This eliminates the use of bark from such trees as the southern pine which has an initial formaldehyde reactivity of 2%.

In addition, a shortcoming that is present in all of the above teachings is that the pertinent bark extended adhesives may only be used in adhering western species veneers such as the Douglas fir. Such adhesives are generally not effective with respect to southern pine veneers which are more difficult to bond together. Southern pine wood is more difficult to glue into plywood than west coast softwood for several reasons, including that the southern pine has a faster growth rate, its wood often has a high rate of peeling; it peels rough and loose, and it is uneven in thickness. In addition, it often has pitchy areas. Further, the southern pine is a more absorptive wood than that of the Douglas fir, i.e., it allows more penetration of the adhesive into the wood structure resulting in a less defined glue line and attendant therewith a weaker bond. Still further, there may be a wide range of specific gravities within a single piece of southern pine veneer, which also may impede the formation of a good bond.

Accordingly, it is an object of the instant invention to provide a high quality phenolic resin adhesive for use in the production of plywood and the like, in which bark dust from a variety of trees such as the fir, pine, cedar, and hemlock, may be used as an extender, and which has the capacity to resist almost unlimited exposure to moisture, heat, and weather.

Another object of the instant invention is to provide a high quality phenolic resin adhesive as described above wherein the phenolic resin, while having a low molecular weight and a low degree of polymerization, permits a press time on the order of seven minutes.

Still another object of the instant invention is to provide a phenolic resin adhesive having the above characteristics and which can be used to adhere veneers of the southern pine species as well as that of the Douglas fir species.

Yet another object of the instant invention is to provide a phenolic resin adhesive having the above characteristics in which the bark dust extender is used to reduce the percentage of phenolic resin as well as to replace any corn cob or like extenders as are generally used in the preparation of the subject adhesives, thereby resulting in a high quality yet more economical adhesive than has heretofore been known.

It is another object of the instant invention to provide an improved method of preparing a phenolic resin adhesive having the above characteristics.

Other objects and advantages of the subject invention will appear in the foregoing description.

SUMMARY OF THE INVENTION

As indicated above, it is known in the art that bark dust may be used as a reactive component and can be added to supplement the adhesive power of phenol-aldehyde resins, as well as serving as an economical extender. It is further known from the art that bark dust contains phenolic components which undergo condensation polymerization with a phenol-aldehyde resin under alkaline conditions, to produce an adhesive that may be used in the preparation of plywood and the like. However, none of the teachings in the art relate to a bark-extended phenolic resin adhesive which is effective in bonding difficult-to-glue veneer such as southern pine. Accordingly, it is a specifc object of the subject invention to provide such an adhesive which is of a high quality and which is effective in bonding southern pine veneers as well as the easier-to-bond western species such as the Douglas fir.

In accordance with the subject invention it has been determined that in order to provide a high quality bark-extended phenolic resin adhesive, it is necessary to increase the reactivity of the bark dust with the phenolic resin to be employed. Accordingly, the adhesive of the subject invention is prepared using a phenol-aldehyde resin having a low molecular weight which is soluble in all proportions in ethanol. This gives the phenolic components of the bark dust more extensive sites for the reaction between the bark components and the growing phenolic resin polymer chain. Contrary to certain known procedures, the use of a low molecular weight resin, in accordance with the subject invention, does not result in an unstable adhesive. In addition, the use of said low molecular weight resins poses no problems with respect to press times. A five-ply construction using the adhesive of the subject invention may be easily cured within seven minutes.

In addition, it has been discovered that if the bark is treated under certain conditions, the formaldehyde reactivity of the bark is increased, and it is also possible to significantly reduce the percentage of resin solids normally present in the reaction mixture. Further, while the known procedures employ powdered or ground corn cob as an extender for the adhesive, if the bark is treated in accordance with the subject invention, the corn cob may be totally replaced by the treated bark. Still further, according to the subject invention, any type of bark, not withstanding its initial aldehyde reactivity, may be treated so as to increase its formaldehyde reactivity.

It has been found that the smaller the size of the bark particles, the more reactive the bark will be with formaldehyde. Also the greater the concentration of the alkali used in the reaction the greater the bark formaldehyde reactivity. Further, if the bark is treated with a surfactant prior to its alkali treatment, the formaldehyde reactivity of the southern pine bark increases, whereas the formaldehyde reactivity for western bark increases with time. Contrary to some known procedures, no appreciable difference in reactivity is noticed when hot caustic or water is used in the reaction as opposed to cold caustic or water.

The above findings are similar for western mill bark as well as for southern mill bark and may be summarized according to the following chart:

CHART I

| Western Mill Bark | Particle Size (mesh) | % Alkali Treating Solution | Time of Alkali Treatment | Average % Formaldehyde Reactivity |
|---|---|---|---|---|
| Cold water with variation in alkali concentration | −100 | 50% | 45 min. | 4.96 |
| | | | 24 hrs. | 6.48 |
| | | | 72 hrs. | 7.07 |
| | | 75% | 45 min. | 3.71 |
| | | | 24 hrs. | 7.5 |
| | | | 72 hrs. | 13.99 |
| | | 90% | 45 min. | 3.58 |
| | | | 24 hrs. | 7.67 |
| | | | 72 hrs. | 23.71 |
| Hot water with variation in alkali concentration | −100 | 50% | 45 min. | 4.56 |
| | | | 24 hrs. | 5.90 |
| | | | 72 hrs. | 6.39 |
| | | 75% | 45 min. | 3.58 |
| | | | 24 hrs. | 8.03 |
| | | | 72 hrs. | 17.10 |
| | | 90% | 45 min. | 3.7 |
| | | | 24 hrs. | 6.3 |
| | | | 72 hrs. | 12.06 |
| Hot water and hot alkali | −100 | 50% | 45 min. | 3.40 |
| | | | 24 hrs. | 4.98 |
| | | | 72 hrs. | 6.54 |
| | | 75% | 45 min. | 4.77 |
| | | | 24 hrs. | 7.88 |
| | | | 72 hrs. | 17.66 |
| | | 90% | 45 min. | 3.66 |
| | | | 24 hrs. | 12.37 |
| | | | 72 hrs. | 23.53 |
| Particle size variation | −100 + 200 | 50% | 45 min. | 4.24 |
| | | | 24 hrs. | 4.32 |
| | | | 72 hrs. | 5.55 |
| | −200 + 325 | 50% | 45 min. | 4.55 |
| | | | 24 hrs. | 4.75 |
| | | | 72 hrs. | 5.73 |
| | −325 | 50% | 45 min. | 4.98 |
| | | | 24 hrs. | 5.21 |
| | | | 72 hrs. | 6.24 |
| Surfactant treatment of Bark | −100 | 50% | 45 min. | 3.48 |
| | | | 24 hrs. | 6.2 |
| | | | 48 hrs. | 7.2 |

| Formaldehyde Reactivity Data - Southern Pine Mills | | | | |
|---|---|---|---|---|
| Southern Pine Mills | | | | |
| Cold water with variation in alkali concentration | −100 | 50% | 45 min. | 2.22 |
| | | | 24 hrs. | 4.92 |
| | | | 48 hrs. | 5.63 |
| | | 75% | 45 min. | 3.3 |
| | | | 24 hrs. | 6.7 |
| | | | 48 hrs. | 15.2 |
| | | 90% | 45 min. | 2.4 |
| | | | 24 hrs. | 14.2 |
| | | | 48 hrs. | 20.6 |
| Hot water with variation in alkali concentration | −100 | 50% | 45 min. | 2.68 |
| | | | 24 hrs. | 4.88 |
| | | | 48 hrs. | — |
| Hot water with variation in alkali concentration | −100 | 75% | 45 min. | 2.60 |
| | | | 24 hrs. | 9.65 |
| | | | 48 hrs. | 17.16 |
| | | 90% | 45 min. | 2.97 |
| | | | 24 hrs. | 16.89 |
| | | | 48 hrs. | 22.95 |
| Hot water and hot alkali | −100 | 50% | 45 min. | 2.78 |
| | | | 24 hrs. | 5.66 |
| | | | 48 hrs. | 6.99 |
| | | 75% | 45 min. | 1.89 |
| | | | 24 hrs. | 6.18 |
| | | | 48 hrs. | 13.39 |
| | | 90% | 45 min. | 3.37 |
| | | | 24 hrs. | 12.18 |
| | | | 48 hrs. | 22.67 |
| Surfactant treatment of Bark | −100 | 50% | 45 min. | 4.84 |
| | | | 24 hrs. | 5.8 |

CHART I-continued

| | |
|---|---|
| 48 hrs. | 7.0 |

DETAILED DESCRIPTION OF THE PREFERRED EMBODIMENTS

Because the heretofore known procedures have been unable to produce a bark-extended phenolic resin adhesive that is effective in bonding hard-to-glue veneers such as the southern pine, the subject invention, as applicable to such wood, will be described first.

For the purpose of evaluating the adhesive of the subject invention, the following chart (CHART II), describing two typical formulae for a phenolic resin adhesive which does not use bark as an extender is presented, and will serve as a control formula.

CHART II

| | Formula 1 Parts by Weight | Formula 2 Parts by Weight |
|---|---|---|
| Water | 500 | 665 |
| Resin | 1231.8 | 300 |
| Corn Cob | 450 | 350 |
| Wheat Flour | 250 | 200 |
| | Mix 5 minutes | |
| Caustic | 170 | 130 |
| | Mix 20 minutes | |
| Resin | 2168 | 2360 |
| | Mix 3–5 minutes | |
| Total Mix | 4700 | 4000 |
| Total Resin | 1403 | 2660 |
| % Total Solids | 46.5 | 44.1 |
| % Resin Solids | 29.8 | 28.5 |

As is evident from the above, two resin additions are required in the preparation of the control formulae. These resins are characterized as low molecular weight resins by gel permeation chromatagraph (GPC) analysis. Both are soluble in all proportions in ethanol.

In accordance with the subject invention, it has been discovered that the control phenol-aldehyde resin adhesive may be extended in two ways. First, a percentage of the phenol-aldehyde resin may be replaced by the same percentage of alkali treated bark. Second, all of the corn cob used in the adhesive may be replaced by an equal amount of treated alkali bark while also reducing the percentage of phenol-aldehyde resin. It can be appreciated that such substitution results in a more economical adhesive.

Example I — For the purpose of replacing 10% and 20% respectively of the phenol-aldehyde resin with an alkali-treated bark, a pre-mix was prepared comprising bark, sodium hydroxide (50%) and water in a ratio of 1 to 1 to 2. The pre-mix was prepared by adding a 50% sodium hydroxide solution to the bark, mixing said components, then adding the required amount of water. By varying the percent phenol-aldehyde resin in the first resin addition in the control formulae, any desired viscosity of the subject adhesive may be obtained. By way of illustration, a series of adhesive mixes was prepared using one formula in which the percent of phenol-aldehyde resin in the first addition was varied. These formulations were prepared as follows:

CHART III

| | 45% of Resin in 1st addition | 50% of Resin in 1st addition | 65% of Resin in 1st addition | 80% of Resin in 1st addition |
|---|---|---|---|---|
| Bark | 73 | 73 | 73 | 73 |
| Caustic* (50%) | 60 | 60 | 60 | 60 |
| H₂O | 146 | 146 | 146 | 146 |
| H₂O | 146 | 146 | 146 | 146 |

CHART III-continued

| | 45% of Resin in 1st addition | 50% of Resin in 1st addition | 65% of Resin in 1st addition | 80% of Resin in 1st addition |
|---|---|---|---|---|
| Resin | 316.34 | 351.6 | 457.5 | 562.4 |
| Bark | 44 | 44 | 44 | 44 |
| Glue X | 65 | 65 | 65 | 65 |
| Caustic | 13 | 13 | 13 | 13 |
| Resin | 386.65 | 351.6 | 245.6 | 140.7 |
| Viscosity** | 9,000 | 8,000 | 4,200 | 2,500 |

*While sodium hydroxide has been used as the caustic in all of the Examples herein, it is clear that any alkali metal hydroxide may be used.
**Viscosities determined at 26° C.

The viscosities of these formulae were plotted against the percent first phenol-aldehyde resin addition and from the curve illustrated in Graph FIG. 1. The above method of adjusting the final viscosity may be used in all preparations of the adhesive of the subject invention.

Adhesive mixes prepared as above, i.e., where 10% and 20% of the total phenolic-aldehyde resin solids portion of the control formulae were replaced by equal percentages of treated bark, were then used in preparing plywood (southern pine) panels under the following conditions:

Assembly Time — 5–30 minutes
Prepress — 172 psi — 3½ minutes
Press Time — 300° F., 200 psi, 7 minutes
Glue Spread — 80–85 lbs/MDGL*
*Thousand square feet Double Glue Line Shear samples of each panel were then subjected to standard boil and vacuum/pressure shear tests, and the shear values and percent wood failure recorded. The results of these tests are reflected in CHART IV as follows:

CHART IV

| | Control | 10% alkali bark replacing 10% phenolic resin | 20% alkali bark replacing 20% phenolic resin |
|---|---|---|---|
| Bark | | 73.3 | 146.1 |
| Caustic (50%) | | 73.3 | 120.1 |
| Water | | 146.6 | 291.9 |
| Water | 262.3 | 293.1 | 291.9 |
| Resin | 645.3 | 360.9 | 632.9 |
| Corn Cob | 236.1 | 162.6 | 87.9 |
| Glue X | 131.2 | 131.0 | 130.0 |
| | | Mix 5 minutes | |
| Caustic (50)% | 89.2 | 15.8 | 25.9 |
| | | Mix 20 minutes | |
| Resin | 1135.8 | 1243.3 | 773.3 |
| Average Shear | | | |
| V/P**-psi | 207.5 | 229.2 | 221.9 |
| % WF*** | 89.1 | 90.4 | 90.7 |
| Boil psi | 181.1 | 198.3 | 189.3 |
| % WF | 92.5 | 89.2 | 93.0 |

**Vacuum/Pressure
***Wood Failure

When the above results are compared with those obtained from the control formulae, it is apparent that a replacement of 10% and 20% of the total phenolic resins solids portion with the alkali treated bark in accordance with the subject invention yields an equally high quality adhesive. It should be noted that it is not necessary to add hot water or hot alkali to obtain the desired results.

EXAMPLE II

In this example, 100% of the corncob used in the control formulae is replaced with treated bark. In addition, the percentage of total phenolic resin solids in the control formulae (28.5%) is reduced and replaced with treated bark. In order to determine the effect on the quality of the adhesive mix when the percent resin solids is reduced, several mixes were prepared each having a different (and reduced) percentage of resin solids, namely, 25.1%, 23.8%, 22.4%, 20.9%, and 18.8%, respectively. The formulations of the various mixes as well as the results of the standard boil and vacuum/pressure shear tests are illustrated in FIG. 2. Referring to the formulations of FIG. 2, 100% of the corncob in the control formulae is replaced with treated bark by preparing a pre-mix comprising sodium hydroxide, water, and about two-thirds of the amount of bark needed to substitute for 100% of the corncob. The remaining one-third of the bark is added later in the formula as a filler with a further addition of caustic. As an alternative, all of the treated bark necessary to make a 100% substitution for the corncob of the control formulae may be included in the pre-mix and the second addition of bark and caustic illustrated in FIG. 2 eliminated.

Referring to the results of the standard boil and vacuum/pressure shear tests it is apparent that in accordance with the subject invention the percentage of total phenolic resin solids used in a glue formulation for adhering southern pine veneers may be reduced to 20.9% while still maintaining a high quality bonding.

Turning now to the preparation of glue mixes used in the production of plywood made from western mill veneers such as the Douglas fir, the following formula is typical:

|  | Parts by Weight |
|---|---|
| Water | 350 |
| Resin | 200 |
| Norprofil | 150 |
| Wheat Flour | 50 |
|  | Mix 5 minutes |
| Caustic (50%) | 52 |
|  | Mix 5 minutes |
| Soda Ash | 20 |
|  | Mix 15 minutes |
| Resin | 800 |
| % Total Resin Solids | 26.51 |
| % Total Solids | 41.67 |

As in the formulae for the preparation of glue mixes for bonding southern pine veneers, the above formula includes two separate resin additions, and the final viscosity of the mix may be adjusted by varying the percentage of resin included in the first drop. It should be noted, however, that the final viscosity of the glue mix used in preparing western mill plywood is much lower than that required to bond southern pine veneers, namely, in a range of about 2,000 to 4,000 cps (measured at 26° C.).

In accordance with the subject invention, a "bark-extended" glue mix for adhering western mill veneers may be prepared by reacting treated bark dust with a phenolic-aldehyde resin under alkaline conditions. More particularly, the bark of any tree which is treated in accordance with the subject invention may be used with a low molecular weight phenol-aldehyde resin to provide a high quality adhesive for the production of plywood and the like, said adhesive having a significantly lower percentage of resin solids than heretofore known adhesives.

EXAMPLE III

In this example, a bark-extended adhesive for the production of western mill plywood was prepared by reacting treated ponderosa pine bark with a phenol-formaldehyde resin which is soluble in all proportions in ethanol. The resin is characterized as a low molecular weight resin through gel permeation chromatagraph (GPC) analysis. Two glue mixes were prepared, each having a successively lower total percentage of resin solids than the control formula (26.5%), namely, 24.6% and 21.9%, said resin solids being replaced by an equal amount of treated bark. The specific formulae for the mixes is illustrated in CHART V as follows:

CHART V

|  | Control 26.51% TRS | Phenol resin replaced with bark-formula contains 24.6% TRS | Phenol resin replaced with bark-formula contains 21.9% TRS |
|---|---|---|---|
| Bark |  | 43 | 86 |
| Caustic (50%) |  | 43 | 86 |
| Water |  | 172 | 344 |
|  | Mix until exotherm subsides | | |
| Water | 350 | 288 | 122 |
| Norprofil | 150 | 107 | 64 |
| Wheat Flour | 50 | 50 | 50 |
| Resin | 200 | 150 | 100 |
|  | Mix 5 minutes | | |
| Caustic (50%) | 52 | 9 | — |
|  | Mix 2 minutes | | |
| Soda Ash | 20 | 20 | 20 |
|  | Mix 15 minutes | | |
| Resin | 800 | 750 | 700 |
|  | Mix 3-5 minutes | | |
| Viscosity (cps) | 1875 | 2100 | 1975 |
| % Total Solids | 41.67 | 40.28 | 38.6 |
| % Total Resin Solids (TRS) | 26.51 | 24.6 | 21.9 |

After the mixes had been prepared they were used in making 11/16" plywood under the following conditions:

Assembly Time — 5-10 minutes
Press Time — 6½-7½ minutes
Pressure — 185 psi
Temperature — 285° F.
Glue Spread 13 65-70 lbs./MDGL*
*Thousand square feet Double Glue Line The plywood was then subjected to the standard boil and vacuum/pressure tests and the results of said tests are illustrated in CHART VI as follows:

CHART VI

|  | Control 26.51% TRS | Phenol resin replaced with bark-formula contains 24.6% TRS | Phenol resin replaced with bark-formula contains 21.9% TRS |
|---|---|---|---|
| Shear Avg. Values | | | |
| V/P**-psi | 151.9 | 147.4 | 167.9 |
| % WF*** | 93 | 96.4 | 89.5 |
| *Thousand square feet Double Glue Line | | | |
| **Vacuum/Pressure | | | |
| ***Wood Failure | | | |
| Boil psi | 138 | 139.3 | 144 |
| % WF* | 98.2 | 98.7 | 90.8 |

*Wood Failure

In summary, the subject invention provides new and improved, high quality bark-extended phenolic resin adhesive compositions to be used in the manufacture of plywood and the like, and which have the capacity to resist almost unlimited exposure to moisture, heat, and weather. The subject adhesives are effective in bonding hard-to-glue veneers such as the southern pine, as well as the easier-to-glue western species such as the Douglas fir. Unlike heretofore known adhesives, any type of bark, not withstanding its initial formaldehyde reactivity, may be used as an extender. In addition, the adhesives of the subject invention are more economical to prepare than heretofore known adhesives in that not only is bark used to reduce the proportion of total resin solids generally used in typical adhesives, but also 100% of the fillers as heretofore required, such as corncob may be replaced by bark.

The foregoing is considered as illustrative only of the principles of the subject invention. Further because numerous modifications and changes will readily occur to those skilled in the art, it is not desired to limit the subject invention to the exact description given above, but rather to include all suitable modifications and equivalents falling within the scope of the invention as claimed.

What is claimed is:

1. A process for preparing a bark-extended phenol-aldehyde resin adhesive composition for bonding wood plies, said composition having a total resin solids proportion of approximately 24.6% and a viscosity of approximately 2,100 cps., said process comprising the steps of:
　preparing a pre-mix by combining:
　　bark, 43 parts
　　sodium hydroxide (50% solution), 43
　　water, 172
　said mixture creating an exothermic reaction;
　　mixing said pre-mix until the exotherm subsides;
　　adding to said pre-mix:
　　　water; 288 parts
　　　Norprofil; 107
　　　wheat flour, 50 parts
　　　phenolic resin, 150 parts
　　mixing said components;
　　then adding:
　　　sodium hydroxide (50% solution), 9 parts
　　mixing said components;
　　then adding:
　　　soda ash, 20 parts
　　mixing said components;
　　then adding:
　　　phenolic resin, 750 parts
　　and mixing said components;
　said phenolic resin being a low molecular weight aqueous alkaline phenol-aldehyde resin having a low degree of polymerization, said resin further being soluble in all proportions in ethanol.

2. A process for preparing a bark-extended phenol-aldehyde resin adhesive composition for bonding wood plies, said composition having a proportion of total resin solids on the order of 21.9% and a viscosity of approximately 1,975 cps., said process comprising the steps of:
　preparing a pre-mix by combining:
　　bark, 86 parts
　　sodium hydroxide (50% solution) 86 parts
　　water, 344 parts
　said combination of components creating an exothermic reaction;
　　mixing said pre-mix until the exotherm subsides;
　　adding to said pre-mix:
　　　water, 122 parts
　　　powdered or ground corn and rice husks or corn cobs, 64 parts
　　　wheat flour, 50 parts
　　　phenolic resin, 100 parts
　　mixing said components;
　　then adding:
　　　soda ash, 20 parts
　　mixing said components;
　　then adding:
　　　phenolic resin, 700 parts
　　then mixing all of said components;
　said phenolic resin being a low molecular weight aqueous alkaline phenol-aldehyde resin having a low degree of polymerization, said resin further being soluble in all proportions in ethanol.

3. A process for preparing a bark-extended phenol-aldehyde resin adhesive composition for bonding wood plies, said adhesive composition having a proportion of total resin solids in the range of approximately 25.1% to 20.9% and a viscosity in the range of approximately 9,000 to 10,600 cps., said process comprising the steps of:
　preparing a pre-mix by combining approximately by weight:
　　bark, 146.5 to 168.2 parts
　　sodium hydroxide (50% solution), 117.1 to 134.6 parts
　　water, 486.7 to 559.3 parts
　said pre-mix creating an exothermic reaction;
　　mixing said pre-mix until exotherm subsides;
　　adding to said pre-mix (approximately):
　　　water, 219.6 to 252.3 parts
　　　bark, 109.8 to 126.2 parts
　　　glue filler, 146.4 to 168.2 parts
　　　phenolic resin, 142.7 to 525.6 parts
　　mixing said components;
　　then adding (approximately):
　　　sodium hydroxide (50% solution), 21.9 to 25.2 parts
　　mixing said components;
　　then adding (approximately):
　　　phenolic resin, 1,151 to 1,482.4 parts
　　　water, 162.1 parts
　　　phenolic resin, 162.1 parts
　　mixing said components;
　said phenolic resin being a low molecular weight aqueous alkaline phenol-aldehyde resin having a low degree of polymerization, said resin further being soluble in all proportions in ethanol.

* * * * *

UNITED STATES PATENT AND TRADEMARK OFFICE
CERTIFICATE OF CORRECTION

PATENT NO. : 4,144,205
DATED : March 13, 1979
INVENTOR(S) : SEYMOUR HARTMAN and MULAYIM OZKAN It is certified that error appears in the above-identified patent and that said Letters Patent are hereby corrected as shown below:

Column 6, line 15, delete "from" and insert in lieu thereof -- form --.

Column 8, line 36, delete "13".

Column 9, line 29, Claim 1, delete "norprofil 107" and insert in lieu thereof -- powdered or ground corn and rice husks or corn cobs --.

Signed and Sealed this

Thirteenth Day of May 1980

[SEAL]

Attest:

SIDNEY A. DIAMOND

Attesting Officer

Commissioner of Patents and Trademarks